United States Patent Office 3,351,582
Patented Nov. 7, 1967

3,351,582
LINCOMYCIN DERIVATIVES AND PROCESS
FOR PREPARING SAME
Jules J. J. Balansard, 36 Rue de la Bibliotheque, and Pierre J. L. Bernard, 229 Ave. du Prado, both of Marseille, France
No Drawing. Filed Oct. 6, 1965, Ser. No. 493,540
Claims priority, application France, Oct. 9, 1964, 990,983; Mar. 12, 1965, 9,069
7 Claims. (Cl. 260—210.5)

This application is a continuation-in-part of copending application Ser. No. 387,776, filed Aug. 5, 1964.

This invention relates to the isolation of plant extracts, particularly saponins and sapogenins.

Saponins are glycosides in which the sugar residue is attached to an aglycone called a sapogenin. They are contained in a large number of plant species and may differ both in the sugars they contain and the precise structure of the sapogenin residue. Saponins derive their name from their characteristic property of forming soapy solutions in water.

This invention provides a new process for the isolation of saponins and saponin-like substances which is simple to operate and leads readily to the isolation of a saponin product pure enough for medicinal use. During the earlier steps of the process, part of the saponin is normally broken down with liberation of a partially degraded product, generally the corresponding sapogenin, and the invention also provides a process for isolating this sapogenin or other product, again by a simple process giving a product pure enough for medicinal use. These medicinal uses of saponins and sapogenins are given in more detail hereinafter. For brevity, the term "saponin" is used herein to mean both saponins and saponin-like substances and the term "sapogenin" is used to mean both sapogenins proper and degradation products of saponins (including saponin-like substances) intermediate between sapogenins and saponins.

The process of the invention for the isolation of a saponin comprises extracting the saponin from plant tissue containing the same with an aqueous organic solvent, concentrating the extract at not above 45° C., mixing the concentrate with water at above 90° C. and removing the insoluble residue, dissolving an electrolyte in the aqueous solution obtained, optionally after partial concentration thereof, to precipitate the saponin contained therein, dissolving the crude precipitated saponin in an organic solvent in which the electrolyte is substantially insoluble, filtering the solution, if necessary after partial concentration to cause precipitation of any remaining electrolyte, and finally evaporating the solution to dryness to produce a saponin concentrate.

The initial extraction with an aqueous organic solvent is preferably carried out with 65–75% aqueous ethanol (which can be denatured) but any solvent of equivalent solvent power may be used, e.g. methanol or isopropanol of equivalent strength or about 75% aqueous methyl acetate or acetone. The amount of such solvent used will ordinarily be from 5 to 15 times the dry weight of the plant tissue.

The extraction is preferably carried out at ambient temperature. The strength of the solvent chosen is important, as it is important that undesirable substances, e.g. mucilages, fruit pectins, and the starches present in seeds, rhizomes and tubercles, should not be extracted. 50% aqueous ethanol does not extract pectins and mucilages, but is liable to extract certain starches. However, the use of 65–75% ethanol makes it possible largely to avoid the extraction of undesirable constituents such as resins, chlorophyll pigments, and terpene derivatives (which would be dissolved by more concentrated ethanol), while satisfactorily dissolving the saponins. In addition, ethanol of this strength (but not 95–98% ethanol) dissolves sugars, hydroxy acids, and polyols, in appreciable proportions, and this is desirable because the presence of such substances tends to improve the solubility of the desired saponins and sapogenins (e.g. those of Digitalis species).

After the initial extract has been concentrated at a temperature not above 45° C., the concentrate is treated with, preferably, boiling water (generally in a proportion of 3 to 6 times the weight of the concentrated extract) which gives an aqueous solution of saponin and an insoluble residue (containing sapogenins which may be isolated as hereinafter described). An electrolyte is then dissolved in the saponin solution to salt out the saponin. This is preferably done by saturation with ammonium sulphate.

It is advantageous to concentrate the solution to an appropriate volume (determined by test) so as to use the minimum quantity of ammonium sulphate which provides an effective salting out. Depending upon the plant tissue and the time when it was gathered, the precise nature of the saponin may vary, so that a simple routine test is necessary. The concentration may be effected by simple evaporation at atmospheric pressure, but generally speaking, reduced pressure will be used to limit the heating time, and reduce the possibility of decomposition of the desired product.

After removal of the crude precipitated saponin, the ammonium sulphate solution may still contain a proportion of saponins and/or sapogenins. If desired these may be extracted with 83–85% aqueous isopropanol. The extract is then evaporated at not above 45° C., preferably at reduced pressure. The residue is then extracted again with methanol or ethanol, and the methanol or ethanol extract is evaporated to dryness. Since the product obtained generally consists predominantly of saponin, it is often convenient to combine it with the crude precipitated saponin obtained by precipitation with an electrolyte, and to purify the mixture further in the manner already defined.

Occasionally, e.g. when the saponin-containing plant tissue is derived from Polygala or Aesculus species, the treatment of the concentrate of the initial extract with boiling water results in the formation of a jelly, which is difficult to manage, and in which it is difficult or impossible to dissolve an electrolyte. Such a jelly may be rendered manageable by the following procedure.

The jelly is mixed with water, ordinarily about four times its weight of water, and 90% aqueous isopropanol is added in a volume approximately equal to the volume of water previously added. The precipitate is then removed, e.g. by centrifugation, and the supernatant liquor further treated in the manner already defined, beginning with the treatment with the electrolyte to precipitate the saponin contained therein. Saturation of the liquor with ammonium sulphate causes not only precipitation of saponin but also salting out of the isopropanol contained in the liquor, and this isopropanol generally retains a proportion of the saponin dissolved therein. Accordingly, the isopropanol may be separated, washed if desired with saturated ammonium sulphate solution, and evaporated. The residue is then dissolved in methanol, and the solution filtered and evaporated. The final residue may be combined with the crude saponins obtained by precipitation with the electrolyte.

The precipitation of the saponin with the electrolyte has the effect of freeing it from the water-soluble substances such as sugars, polyols, salts (including betaines) and bases which remain in the aqueous solution, and traces of which may be removed from the precipitated saponin by washing with electrolyte solution (e.g. saturated ammonium sulphate solution). Moreover, if this solution is extracted with isopropanol in the manner already described, the said water-soluble substances are left behind in the aqueous phase, or can readily be eliminated from the isopropanol extract by washing with saturated ammonium sulphate solution.

The crude precipitated saponin (with or without the additional crude saponin obtained by extracting the electrolyte solution with isopropanol) is then dissolved in an organic solvent in which the electrolyte is insoluble. It is advantageous to mix the crude saponin with an inert diluent, such as infusorial earth, and to dry (e.g. with infrared rays) and powder it, before it is extracted. The organic solvent is preferably a lower alkanol, especially 80–100% aqueous ethanol or 95–100% aqueous methanol (e.g. 98% industrial methanol). The precise solvent must be chosen having regard to the saponin being extracted, for example the saponins of Quillaja, Saponaria, and Polygala are only sparingly soluble in cold 95% ethanol but readily soluble in 98% methanol.

The weight of organic solvent used is generally 4 to 10 times the weight of the crude precipitated saponin, and is then evaporated to less than a quarter of the original volume to precipitate any electrolyte present. After removal of any precipitated electrolyte, e.g. by filtration, the solution is evaporated to dryness to produce a saponin concentrate.

This concentrate may be further purified by dissolution in methanol followed by filtration and evaporation to dryness. A substantially pure saponin can be obtained by mixing a saponin concentrate produced in the manner described with a mild inorganic alkali such as magnesia (basic magnesium carbonate) and enough water to produce a paste, drying this paste, and extracting the saponin from the dried mixture with an organic solvent. Evaporation of the extract gives substantially pure saponin.

As already stated, during the above described isolation procedure for saponins, a sapogenin-containing residue is produced. The invention provides as a further feature a process for the isolation of a sapogenin from saponin-containing plant tissue which comprises extracting the said tissue with an aqueous organic solvent, concentrating the extract at not above 45° C., mixing the concentrate with water at above 90° C., separating the insoluble sapogenin-containing residue, removing oily and resinous materials from the said residue by extraction with an organic solvent, mixing the extracted residue with a mild inorganic alkali and at least sufficient water to form a paste, drying the said mixture, extracting the sapogenin therefrom with an organic solvent, and finally evaporating the organic solvent solution to dryness to produce crude sapogenin (as such or when the sapogenin is capable of forming salts, as a salt thereof corresponding to the mild alkali used). In this process, the steps up to the separation of the water-insoluble sapogenin-containing residue are carried out in the manner previously described. The oily and resinous materials are removed from this residue by extraction with an organic solvent, preferably anhydrous acetone or methylethylketone. The acetone or methylethylketone may be replaced by a chlorinated solvent such as trichloroethylene or chloroform or by an ester such as ethyl acetate or by diethylether, when the sapogenin is completely or partially soluble in the ketone. However, acetone and methylethylketone are preferred because of their higher solvent power for impurities.

The mild inorganic alkali with which the extracted residue is mixed is preferably magnesia, and after the paste obtained has been dried, the sapogenin it contains is preferably extracted with methanol or, less preferably, ethanol. The latter extract is then preferably treated with activated charcoal before evaporation to dryness to produce crude sapogenin.

Certain sapogenins contain acid, e.g. carboxyl, groups either free or internally bound as in a lactone group. When such sapogenins are extracted by the above-defined process, they are obtained in the form of salts with the mild inorganic alkali used in the isolation procedure. Where this is not desired, or where, for any other reason, it is desired to avoid the use of the mild inorganic alkali, the sapogenin may be isolated by a process which comprises extracting saponin-containing plant tissue with an aqueous organic solvent, concentrating the extract at not above 45° C., mixing the concentrate with water at above 90° C., separating the insoluble, sapogenin-containing residue, removing tannins and oily and resinous materials from the said residue by extraction with an aqueous alkanol, an alkyl alkanoate, a chlorinated solvent, or a lower ketone in which the sapogenin is insoluble, dissolving the extracted residue in a substantially anhydrous alkanol, and evaporating the alkanol to cause the sapogenin to crystallize out of the solution. In this procedure, the insoluble, sapogenin-containing residue to preferably extracted with 35–55% aqueous methanol, ethanol or isopropanol to remove tannins and with ethyl acetate, a chlorinated solvent, or a lower ketone to remove oily and resinous materials. The extracted residue is then preferably dissolved in methanol, ethanol, isopropanol, or methyl acetate, and the solution is evaporated to cause the sapogenin to crystallize out.

The isolation procedures of the present invention are especially valuable as applied to the isolation of the saponins and corresponding sapogenins present in the leaves of *Hedera helix* L. As detailed hereinafter, the products thus obtained have interesting pharmacological and chemotherapeutic properties. However, the new procedures can equally be applied to other saponin-containing plant tissues, e.g. *Smilax officinalis* L. (roots), *Saponaria officinalis* L. (roots), *Yucca angustifolia* Pursk. (leaves), *Agave americana* L. (leaves), *Polygala officinalis* (roots), *Ruscus aculeatus* L. (rhizome), *Pulsatilla vulgaris* (leaves and flowers), *Clematis viltalba* L. (leaves), and *Sapindus mukurossi* Gaertn (fruits). Other plants from which interesting extracts may be obtained by the new procedures are: *Cupressus sempervirens* L. (galbuli), *Salix alba* L. (leaves), *Juglans regia* L. (leaves), *Magnolia grandiflora* L. (leaves), *Nymphaea alba* Presl. (rhizome), *Catha edulis* Forsk. (leaves), *Euphorbia hirta* L. (tops), *Rubus fruticosus* L. (leaves), *Prunus laurocerasus* L. (leaves), *Combretum micranthemum* Don. (leaves), *Viscum album* L. (leaves), *Globularia alypum* L. (leaves), *Rosmarinus officinalis* L. (flower heads), *Salvia officinalis* L. (leaves), *Olea europea* L. (leaves), *Fraxinus excelsior* L. (leaves), *Eucalyptus globulus* Labill. (leaves), *Lycium barbarum* L. (leaves), *Cucurbita pepo* Duch (seeds), *Cinchona succirubra* Pav. and *C. calysaya* Wedd. (bark) *Onicus benedictus* L. (capitula), *Tanacetum vulgare* L. (tops), *Calendula officinalis* L. (flowers and leaves), and other species of the same genera.

The following example illustrates the invention.

EXAMPLE 100 kg. of dried leaves of *Hedera helix* L. are ground and lixiviated with 775 kg. of 70% ethanol. The alcoholic extracts obtained are combined and concentrated at a temperature of 45° C. under pressure of 20 mm. Hg until the mixture has the consistency of honey. 30 kg. of aqueous alcoholic extract are thus obtained. This extract is taken up with 120 kg. of boiling water and the mixture is cooled and filtered. 125 kg. of filtrate and 6.850 kg. of a pastry water-insoluble residue are obtained.

(a) The filtrate is worked up as follows:

The filtrate is concentrated by boiling under atmospheric pressure to a weight of 68 kg. and then cooled. 38 kg. of ammonium sulphate are dissolved in the concentrate and the precipitate is filtered off. The precipitate is taken up with 12 litres of water, and 10 kg. of ammonium sulphate are added, and the mixture is filtered. The filtrates are combined to give 98 kg. of liquor saturated with ammonium sulphate. The insoluble precipitate weighs 18.6 kg.

The precipitate is extracted in the cold, four times, with a total of 100 litres of 93% ethanol. The aqueous ethanolic extract thus obtained (94 litres) is filtered, concentrated to 31 litres at a temperature of 45° C. under a pressure of 20 mm. Hg, kept overnight at 4° C. to produce precipitation of ammonium sulphate and filtered. The filtrate is concentrated to dryness, and powdered, 8.8 kg. of a purified extract are obtained, which may be further purified, if necessary, by dissolution in 98% methanol, filtration and evaporation to dryness to produce an extract containing about 60% of saponin.

The purified extract, whether or not it has been subjected to the further purification procedure may be used directly or still further purified in the following way. 1.760 kg. of light calcined magnesia worked up to a paste with 4.4 kg. of distilled water are added thereto. In order to combine the tannic substances well, it is desirable to dry this paste slowly. Thus, it may be left in contact with air for 3 hours or dried under infra-red rays, but it is preferable to leave it at least for 24 hours or better still for 48 hours in the open air on plates, and then to dry it in vacuo and to powder it. 10.5 kg. of a powder are thus obtained which is extracted in three stages, in the cold and with stirring, with 105 litres in all of 98% industrial methyl alcohol. After filtration, 2.65 kg. of activated charcoal are aded to the filtrate (86 litres) to decolourise it; it is filtered again and the filtrate is concentrated in vacuo and the residue is dried in vacuo and powdered. 1.99 kg. of an almost pure saponin (95–97% pure) are thus obtained.

(b) The water-insoluble residue is purified as follows:

Two modes of treatment are possible, depending upon whether it is desired to obtain the magnesium salt of the sapogenin, or the sapogenin itself.

(1) The 6.85 kg. of water-insoluble residue are taken up in 22 litres of acetone to remove therefrom pigments, oils and resins. The insoluble part is separated and dried (275 g.). 55 g. of light magesia are added thereto and the whole is worked into a paste with 55 g. of distilled water. The paste is left in the open air on a plate for 48 hours and dried in a chamber in vacuo and the residue is ground. 330 g. of powder are thus obtained. This powder is stirred in three stages with 2.75 litres in all of 98% methanol. The product is filtered, giving 2.2 litres of filtrate, to which 220 g. of activated carbon are added to decolourise it. After filtration, the filtrate is evaporated to dryness. The purified product thus obtained (120 g.) may be used directly. It contains the magnesium salt of the sapogenin (which is a lactone), undecomposed sapogenin, and traces of terpene derivatives.

It may be further purified as follows. It is dissolved in 2 litres of boiling 98% isopropanol. After cooling, the solution is filtered, and the residue is separated and dried. The magnesium salt of the sapogenin is insoluble in 98% isopropanol, unlike the sapongenin itself and the terpene derivatives. 75 g. of a product are obtained which consists essentially of the magnesium salt of the sapogenin. The infra-red spectrum shows that the peak which characterizes the lactone function has disappeared.

(2) The water-insoluble residue contains a considerable quantity of tannic substances and impurities such as resins, oils, and pigments.

To eliminate the tannic substances, 620 g. of the water-insoluble residue are extracted with 1.5 litres of hot 45% ethanol, which dissolves these tannic substances, and is then cooled in a refrigerator for 12 hours and filtered through a Büchner funnel. The precipitate is washed with 200 ml. of 45% ethanol at 0–15° C. and is dried under the infra-red rays. 380 g. of dry residue are thus obtained.

This residue is dissolved in the cold or at elevated temperature in 98% methanol in a proportion of about 1.5 litres to 100 g. of residue. After concentration to a small volume (about 800 ml.), the solution is placed in a refrigerator. The impure sapogenin crystallizes out and is separated. One or more recrystallizations from the same alcohol are sufficient to give a sapogenin of good purity.

In the operations described under (2) the ethanol alcohol may be replaced, in the initial extraction, by denatured alcohol or by methanol or isopropanol, all in a concentration of about 45%.

The extracted residue may be dissolved in ethanol, isopropanol or methyl acetate, but methanol is preferred. Before it is taken up in the methanol or the solvent, the residue may be treated, for the purpose of purification (notably to remove impurities such as resins, oils and pigments), with an auxiliary solvent in which the sapogenin is insoluble. For this purpose, there may be employed ethyl acetate in a quantity of about 2.5 litres, in which case about 350 g. of purified dry residue are recovered after cooling, filtration and evaporation of the ester. The ethyl acetate may be replaced by chloroform, trichloroethylene or methylethylketone.

The saponin obtained by treatment of the water-soluble fraction as described under (a) in this example is an amorphous powder of creamy white colour, which is sternutatory and bitter. It is easily soluble in water, methanol and ethanol, but substantially insoluble in acetone and ethyl acetate. At 195–200° C., it melts indistinctly.

The sapogenin obtained under (b) is a white amorphous powder which is insoluble in water at acid pH, sparingly soluble in water at alkaline pH, soluble in methanol, ethanol and isopropanol, even when diluted, and fairly soluble in methyl acetate at elevated temperature. It sublimes entirely at 225° C.

By acid hydrolysis or enzymatic hydrolysis with snail (*Helix pomatia*) extract, both the saponin and the sapogenin give the same aglycone, which has been identified as hederagenin.

The absorption spectra in ultra-violet light of the saponin, the sapogenin and the hederagenin, in methanol solutions containing 100 microgrammes per ml., are very similar and of little significance. In concentrated sulphuric acid (after one hour at 37° C. in accordance with the Zaffaroni technique), the differences are more marked. In the infra-red spectra, with the substances tabletted in potassium bromide, the hederagenin shows an intense band at 1695 cm.$^{-1}$ (C=O group) associated with a wide band at bout 2560 cm.$^{-1}$ (OH group), which might indicate the presence of an acid function associated by a hydrogen bond, in dimeric form (plus other bands indicating the existence of an alcoholic OH and perhaps of a C—OH group). The 1695 cm.$^{-1}$ band of the saponin changes to 1736 cm.$^{-1}$ (perhaps because of the absence of dimerisation) and, with the sapogenin, remains unchanged. The absence of an intense band at about 1250 cm.$^{-1}$ indicates the presence of an ester function. The OH band of the COOH group seems to subsist (shoulder at 2670 cm.$^{-1}$).

The magnesium salt has a spectrum characterized by a reduction of the intensity of the 1695 cm.$^{-1}$ band and the appearance of a further band at 1546 cm.$^{-1}$, which tends to show that the band attributed to the lactonic grouping disappears with the formation of the magnesium salt, but reappears in acid media.

The saponin has substantially no haemolytic power (a haemolytic index of 1/3200 in physiological serum and 1/400 in human plasma). The sapogenin and its magnesium salt have, on the other hand, a very high haemolytic power (an index 1/400,000 in physiological serum and 1/6000 in human serum for the lactone; and 1/200,000 and 1/1600 respectively for the magnesium salt). The acute toxicity of the saponin is low (the LD 50 of 4 g./kg. in the mouse by the subcutaneous route), while it is higher, without being very high, in the case of the sapogenin (LD 50=0.2 g./kg.). The lactone is not well tolerated by the mouse but is better tolerated by the guinea pig and the rabbit.

The activity of the saponin and the sapogenin have been tested by the applicants on: (1) The germination of bulbs, more particularly cloves of common garlic (*Allium sativum* L.); (2) lower organisms (paramoecia, spores of lower fungi and yeasts).

Similar tests made with the crude extract show that its action is similar to that of the saponin.

When administered by internal probe in a dosage up to 1 g./kg. in rats weighing 140 to 160 g., the purified extract produced no disorder in the behaviour of the animals. This extract, in 20% aqueous solution, was administered for six consecutive days to two batches of 10 rats weighing between 140 and 160 g. in daily doses of: 500 mg./kg. in the first batch, and 1000 mg./kg. in the second batch. The animals were watched throughout the week of treatment and the following week. Nothing abnormal and no sign of toxicity were observed apart from diarrhoeal episodes and a constant lack of appetite during the treatment, the appetite returning gradually in the week following the end of the treatment.

On rats weighing from 140 to 160 g., the saponin administered as a 20% aqueous solution by means of a probe produced no disorder in the behaviour of these animals in a dosage of 1 g./kg.

It is difficult in practice to exceed this dose of 0.16 g. in 0.8 ml. if it is desired not to exceed an ingested volume of 1 ml.

On mice weighing 25–30 g., the saponin administered in the same way in a dosage of 4 g./kg. produces no particular effect except for a temporary diarrhoeal episode.

The saponin was administered by probe to four batches of 10 rats weighing from 140 to 160 g. for 6 consecutive days in daily doses of: 100 mg./kg. for batch No. 1; 250 mg./kg. for batch No. 2; 500 mg./kg. for batch No. 3; and 1000 mg./kg. for batch No. 4. The animals were watched throughout the week of the treatment and the following week.

No particular sign was noted apart from a few diarrhoeal stools in the case of batches Nos. 3 and 4. At the end of the experiment it was found that the majority of the animals had gained weight.

The insolubility in water of the sapogenin made it necessary to use in the acute toxicity test a gummy suspension the composition of which was as follows:

|  | G. |
|---|---|
| Magnesium salt of the sapogenin | 20 |
| Gum-arabic | 0.5 |
| Water to 100 ml. | |

0.8 ml. of this suspension, administered by probe to rats weighing 140/160 g., causes no toxic symptoms and does not in any way modify the behaviour of these animals. A dosage of 1 g./kg. is therefore not toxic.

It seems clear that the insolubility in water is the cause of the absence of toxicity of this sapogenin, because if a solution of it in 25% alcohol is administered by probe to mice weighing 25 g., it is found that doses of 5 mg. result in the death of the animals in the hours following the absorption. The acute toxicity is here shown in doses of 0.2 g./kg.

The sapogenin was also administered by probe as a 1:10 gummy suspension to four batches of 10 rats each, weighing between 140 and 160 g., for 6 consecutive days in daily doses of: 100 mg./kg. for the animals of the 1st batch; 250 mg./kg. for the animals of the 2nd batch; 500 mg./kg. for the animals of the 3rd batch; and 1000 mg./kg. for the animals of the 4th batch. The animals were watched throughout the week of the treatment and the succeeding week. No modification in their behaviour and no toxic manifestation were observed apart from diarrhoeal episodes in the case of batches 3 and 4. At the end of the experiment, it was found that the majority of these animals had gained weight.

The sapogenin may be presented, for medicinal use, as a 5% solution in 30% alcohol for administration orally as drops, or as suppositories each containing 200 mg. of lactone, or as capsules each containing 300 mg., or as gelatine-glycerin ovules containing 150 mg. of the magnesium salt of the sapogenin. The saponin may be prepared as 350 mg. capsules or suppositories containing dosages of 500 mg. The crude extract may also be prepared as capsules containing dosages of 350 mg. Injectable solutions presented in ampoules and intended for intravenous injection may also be prepared therefrom, containing doses of 0.5 or 1 g.

The saponin, sapogenin, and the crude extract containing them possess an inhibiting power on the growth of Protozoa. They may therefore be employed as a parasiticide for combatting certain Protozoa, more particularly Trichomonas. The average daily dosage is about 1.4 g. of saponin, 2 to 3 grammes of crude extract, or 1 g. of sapogenin.

We claim:

1. A process for obtaining an extract from a plant tissue, which comprises extracting said plant tissue with 5 to 15 times its dry weight of an alcohol selected from the group consisting of 65–75% aqueous ethanol, 65–75% aqueous methanol and 65–75% aqueous isopropanol at ambient temperature, concentrating the alcoholic extract thus obtained at a temperature not above 45° C., mixing the concentrate thus obtained with water at above 90° C., cooling the mixture thus produced, removing the insoluble residue therefrom, adding ammonium sulphate to the remaining aqueous solution until said solution is saturated, separating the precipitate thus produced, and drying the separated precipitate.

2. A process according to claim 1 in which the saponin-containing plant tissue is leaves of *Hedera helix* L.

3. The process of claim 1, wherein said plant tissue is leaves of *Hedera helix* L., said precipitate before being dried is mixed with magnesia and water to form a paste, said paste is dried, the dry paste is dissolved in methanol, and the solution thus produced is evaporated.

4. A process for obtaining an extract from a plant tissue, which comprises extracting said plant tissue with 5 to 15 times its dry weight of an alcohol selected from the group consisting of 65–75% aqueous ethanol, 65–75% aqueous methanol and 65–75% aqueous isopropanol at ambient temperature, concentrating the alcoholic extract thus obtained at a temperature not above 45° C., mixing the concentrate thus obtained with water at above 90° C., cooling the mixture thus produced, removing the insoluble residue therefrom, adding ammonium sulphate to the remaining aqueous solution until said solution is saturated, separating the precipitate thus produced, extracting the remaining liquid with 83–85% aqueous isopropanol, and evaporating the isopropanolic extract thus obtained at a temperature not above 45° C.

5. A process for obtaining an extract from a saponin-plant tissue, which comprises extracting said plant tissue with 5 to 15 times its dry weight of an alcohol selected from the group consisting of 65–75% aqueous ethanol, 65–75% aqueous methanol and 65–75% aqueous isopropanol at ambient temperature, concentrating the alcoholic extract thus obtained at a temperature not above 45° C., mixing the concentrate thus obtained with water at above 90° C., cooling the mixture thus produced, separating the insoluble residue therefrom, extracting said residue with a ketone selected from the group consisting of acetone and methyl ethyl ketone, mixing the extracted residue with magnesia and at least sufficient water to form a paste, drying said paste, extracting said paste with an alcohol selected from the group consisting of methanol and ethanol, and evaporating said alcohol from the extract thus obtained.

6. A process according to claim 5 in which the saponin-containing plant tissue is leaves of *Hedera helix* L.

7. The magnesium salt of a sapogenin produced by the process of claim 5.

(References on following page)

References Cited

UNITED STATES PATENTS

| | | | |
|---|---|---|---|
| 2,069,687 | 2/1937 | Stoll et al. | 260—210.5 |
| 2,774,714 | 12/1956 | Hershberg et al. | 260—210.5 |
| 2,791,581 | 5/1957 | Wall et al. | 260—210.5 |

FOREIGN PATENTS

| | | |
|---|---|---|
| 1,147,222 | 4/1963 | Germany. |

OTHER REFERENCES

Hess, Chem. Abst., volume 61, 1964, page 9966C.

LEWIS GOTTS, *Primary Examiner.*

ELBERT L. ROBERTS, *Examiner.*

J. R. BROWN, *Assistant Examiner.*

UNITED STATES PATENT OFFICE
CERTIFICATE OF CORRECTION

Patent No. 3,351,582                      November 7, 1967

Jules J. J. Balansard et al.

It is hereby certified that error appears in the above numbered patent requiring correction and that the said Letters Patent should read as corrected below.

In the heading to the printed specification, lines 2 and 3, for "LINCOMYCIN DERIVATIVES AND PROCESS FOR PREPARING SAME" read -- PROCESS FOR OBTAINING PLANT EXTRACTS --; column 1, lines 11 and 12, strike out "This application is a continuation-in-part of copending application Ser. No. 387,776, filed Aug. 5, 1964.".

Signed and sealed this 17th day of December 1968.

(SEAL)
Attest:

Edward M. Fletcher, Jr.                      EDWARD J. BRENNER

Attesting Officer                            Commissioner of Patents